(12) United States Patent
Smith

(10) Patent No.: US 8,688,740 B2
(45) Date of Patent: Apr. 1, 2014

(54) SYSTEM AND METHOD FOR THE MAINTENANCE AND MANAGEMENT OF COMMERCIAL PROPERTY DATA

(75) Inventor: Robert E. Smith, Orlando, FL (US)

(73) Assignee: Smith Equities Corporation, Orlando, FL (US)

( * ) Notice: Subject to any disclaimer, the term of this patent is extended or adjusted under 35 U.S.C. 154(b) by 1088 days.

(21) Appl. No.: 11/167,071

(22) Filed: Jun. 24, 2005

(65) Prior Publication Data

US 2006/0294011 A1  Dec. 28, 2006

(51) Int. Cl.
*G06F 17/30* (2006.01)

(52) U.S. Cl.
USPC ............ 707/792; 707/793; 707/803; 707/809

(58) Field of Classification Search
None
See application file for complete search history.

(56) References Cited

U.S. PATENT DOCUMENTS

| | | | |
|---|---|---|---|
| 5,664,115 A | 9/1997 | Fraser | |
| 5,754,850 A | 5/1998 | Janssen | |
| 6,529,908 B1 * | 3/2003 | Piett et al. ............................. | 1/1 |
| 6,594,633 B1 | 7/2003 | Broerman | |
| 6,633,875 B2 * | 10/2003 | Brady .......................... | 705/36 R |
| 6,636,803 B1 | 10/2003 | Hartz, Jr. et al. | |
| 6,684,196 B1 | 1/2004 | Mini et al. | |
| 6,757,710 B2 | 6/2004 | Reed | |
| 7,386,496 B1 * | 6/2008 | Braun et al. .................. | 705/36 R |
| 2001/0032089 A1 * | 10/2001 | Schiller .............................. | 705/1 |
| 2001/0037273 A1 * | 11/2001 | Greenlee, Jr. ................... | 705/35 |
| 2002/0035535 A1 * | 3/2002 | Brock, Sr. ........................ | 705/37 |
| 2002/0065739 A1 | 5/2002 | Florance et al. | |
| 2002/0082903 A1 * | 6/2002 | Yasuzawa ........................ | 705/10 |
| 2002/0087389 A1 * | 7/2002 | Sklarz et al. .................... | 705/10 |
| 2002/0138485 A1 | 9/2002 | Faudman | |
| 2002/0161779 A1 * | 10/2002 | Brierley et al. ........... | 707/103 R |
| 2003/0036963 A1 | 2/2003 | Jacobson et al. | |
| 2003/0055747 A1 * | 3/2003 | Carr et al. ....................... | 705/27 |
| 2003/0061114 A1 * | 3/2003 | Schwartz et al. ............... | 705/26 |
| 2003/0078897 A1 | 4/2003 | Florance et al. | |
| 2003/0187756 A1 | 10/2003 | Klivington et al. | |
| 2003/0220805 A1 | 11/2003 | Hoffman et al. | |
| 2003/0220807 A1 | 11/2003 | Hoffman et al. | |
| 2003/0229592 A1 | 12/2003 | Florance et al. | |
| 2004/0019634 A1 * | 1/2004 | Van Geldern et al. ........ | 709/203 |
| 2004/0021584 A1 | 2/2004 | Hartz, Jr. et al. | |
| 2004/0030616 A1 | 2/2004 | Florance et al. | |
| 2004/0039581 A1 | 2/2004 | Wheeler | |
| 2004/0044696 A1 | 3/2004 | Frost | |
| 2004/0054606 A1 | 3/2004 | Broerman | |
| 2004/0098269 A1 | 5/2004 | Wise et al. | |
| 2004/0128215 A1 | 7/2004 | Florance et al. | |
| 2004/0143450 A1 | 7/2004 | Vidali | |

(Continued)

OTHER PUBLICATIONS http://www.costar.com/ as printed on Aug. 26, 2005.

*Primary Examiner* — Mohammad S Rostami

(74) *Attorney, Agent, or Firm* — Bell & Manning, LLC

(57) ABSTRACT

A method and a system for maintaining current data in a database is provided. The method includes sending a request to verify the accuracy of a data item to a data verifier, the data item selected from a set of data items, and the data verifier associated with the data item, receiving a response from the data verifier, the response indicating that the data item is verified, and providing a service to the data verifier after receiving the response. In an exemplary embodiment, the service is a free report including rental rate comparisons for a plurality of real estate properties.

32 Claims, 17 Drawing Sheets

(56) References Cited

U.S. PATENT DOCUMENTS

| | | |
|---|---|---|
| 2004/0220906 A1 | 11/2004 | Gargi et al. |
| 2005/0060228 A1* | 3/2005 | Woo .............................. 705/14 |
| 2005/0071376 A1* | 3/2005 | Modi ......................... 707/104.1 |
| 2005/0160019 A1* | 7/2005 | Cluse et al. .................... 705/35 |
| 2005/0160033 A1* | 7/2005 | VanKirk et al. ................. 705/38 |
| 2005/0211765 A1* | 9/2005 | Brown et al. ................. 235/379 |
| 2005/0222861 A1* | 10/2005 | Silverman et al. ................ 705/1 |
| 2006/0015755 A1* | 1/2006 | Jaffe ............................. 713/193 |
| 2006/0190279 A1* | 8/2006 | Heflin .............................. 705/1 |
| 2006/0235712 A1* | 10/2006 | Rodriguez ........................ 705/1 |

* cited by examiner

FIG. 4

| | MemberID | FirstName | LastName | Company | RoleName | Email |
|---|---|---|---|---|---|---|
| ☐ | zadmin | z | Admin | NexHorizon | Admins | mrosario@nexHorizon.net |
| ☐ | Scarboro | Gary | Scarboro | Apartment Association of Greater Orlando | Admins | gary@aaqo.org |
| ☐ | Torman | Victoria | Torman | Apartment Association of Greater Orlando | Admins | victoria@aaqo.org |
| ☐ | Ogier | Mark | Ogier | Apartment Association of Greater Orlando | Admins | mogier@contravest.com |
| ☐ | Yoder | Laura | Yoder | Sanford Landing | | laura@aaqo.org |
| ☐ | GSmith | Gerald | Smith | Smith Equities Corporation | Property Manager | gs@amecs.com |
| ☐ | RSmith | Robert | Smith | | Property Manager | res@amecs.com |
| ☐ | SBrown | Stephanie | Brown | Trammell Crow Residential Services | Property Manager | sbrown@tcresidential.com |

Clear Selections    New Member

FIG. 5

New Record   Save   Delete   Back

Enter information for new member. Please make sure e-mail address is valid.

Member ID _____   Company _____
Password _____   Phone _____
Email _____   Phone Ext _____
Member Role [Admins ▼]   Block Emails [No ▼]
First Name _____   Disabled [No ▼]
Last Name _____   Active [Yes ▼]

FIG. 9  Select type of e-mail you want to broadcast:

Blank HTML E-mail ▸ Next

Blank HTML E-mail
Property Update Request —— 210
Announce Rental Surveys

— 186

182 — Reports
184 — Admin

Home Page
190

Property Search
192

Member Editor
194

Message Log
196

Log out

— 180

Property Search
Use the following filter fields to find properties. The results of the property search will also enable you to view detailed property information and contact property managers by HTML e-mail.

Property name: [         ]          Metro area:    [         ▸]
County:        [         ]          Submarket:     [         ▸]  — 188
City:          [         ]          Property type: [         ▸]
Total Units:   [   ] to [   ]
Year built:    [   ] to [   ]       [Search] [Clear]
                                    [Account Page]

FIG. 7

As a non-profit association, we gather rental and occupancy information on each apartment property in the Metro Orlando area. We will be sending these updates to you monthly and all participants will have the ability to select up to 10 properties surrounding your property and print market comparable reports for use in managing your property. Your participation in this survey is greatly appreciated.

Please review the rents and occupancies we have on file for Sanford Apartments (See table below) and if there is no change since last month, please click <u>no change</u> or to make changes to your rents, concessions, or vacancies by clicking on this link:

<u>Update Property Information</u> ←——— 212
                                  ←——— 214

Simply make your corections, save and you will then be able to see rent comps on up to 10 other apartment communities.

Sanford Apartments-Sample

| ID | Model Name | Qty | Unit type | Bedrooms Den | Loft | Furn | Baths AC SF | Starting Rent/Mo | Current Rent/SF | Rent as of date | Units Rentable | Units Vacant | Concessions-Sample |
|----|------------|-----|-----------|--------------|------|------|-------------|------------------|-----------------|-----------------|----------------|--------------|--------------------|
| 1 | 783 | 104 | F | 1No | No | No | 1 783 | 589 | $0.77 | 3/15/2005 | 104 | 18 | 1 month Free |
| 2 | 925 | 52 | TH | 2No | No | No | 1 925 | 699 | $0.77 | 3/15/2005 | 52 | 2 | None |
| 3 | 925 | 52 | TH | 1No | Yes | No | 2 925 | 700 | $0.78 | 3/15/2005 | 52 | 2 | None |
| 4 | 983 | 56 | F | 2No | No | No | 2 983 | 750 | $0.78 | 3/15/2005 | 56 | 7 | 0 |
| Totals/Avgs | | 264 | | | | | 881 | $680.30 | $0.77 | | | | |

←——— 216

If you currently do not have an active membership with The Apartment Association of Greater Orlando (AAGO), please click the following link to find out more information regarding membership benefits and how to sign up.

Sanford Landing
Set up New User Account

Please complete the following form to obtain a new user account which will allow you to make changes on Sanford Landing. If you already have an account, please visit the login screen. Can't remember your member ID or password? Click here to recover your member ID or password.

After creating your account, you will have full rights to make corrections to Sanford Landing. You will also have the ability to select up to 10 properties surrounding your property and print market comparable reports for use in managing your property.

First Name: Gerald
Last Name: Smith
Company: Sanford Landing
MemberID: GSmith
Password:
Confirm Password:
E-mail: gs@amecs.com
Phone: _____ Ext: ____

[ Create Account ]
[ Join The Apartment Association of Greater Orlando (AAGO) ]

FIG. 12

Sanford Landing

| Contact Info | Overview | Community Amenities | Development Features | Unit Mix/Rent | Unit Amenities | Rent Comps | Property Pictures |

◆ Property Management

Management Company: SPM, Inc.    Property Manager:

◆ Metro Area: Orlando MSA
◆ County: Seminole
◆ SubMarket: OA-Sanford

◆ Rental Overview:
Enter the marketing overview on this property here. This is the general description of your property that displays on the resident login summary tab.

◆ Directions To Property:
East on I-4 to exit 51. Sanford Landing is just 3 minutes east of Seminole Towne Centre Mall on SR 46.

*Note: In Order for you to run a Rental Comp report on upto 10 properties, you will need to verify the data and rents on your property. If you feel your competor's information needs to be updated, have the property manager call us for their password they can keep their information updated.

[ Save Changes ]

244 → (Contact Info tab)
240 → (Rental Overview area)
242 — (Save Changes button)

Sanford Landing

| Contact Info | Overview | Community Amenities | Development Features | Unit-Mix/Rent | Unit Amenities | Rent Comps | Property Pictures |

| Effective Yr Built: | 1982.5 | | Elevator : | No |
| Yr Built From: | 1982 | | Renovated: | Y/N ☐ |
| Yr Built To: | 1983 | | Date Renovated: | |
| Units Built: | 264 | | ◆ Building Structure | |
| Units under Construction: | 0 | | Building: | Wood Frame |
| Total Units: | 264 | | Exterior Wall: | Brick with Stucco |
| Total Acres: | 22.1 | | Roofs: | Asphalt-fiberglass |
| Density/DU/Acre : | 11.9 | | Number of Buildings: | 33 |
| ◆ Type Property: | APT | | Number of Floors: | 2 |
| Class: | B | | ◆ Unit Entry Type | Exterior corridor |
| Bond Financing: | No | | ◆ Garages: | |
| Type of Bond: | | | Attached | 0  0 cars/garage |
| ◆ Parking: | | | Detached | 0  0 cars/garage |
| Car Ports: | | | Total Garages | N |
| Surface: | 396 | | Comments: | *And 1983. Project accessed by divided |
| Covered: | 0 | | | |
| Total: | 396 | | | |
| Spaces Per Unit: | 1.5 | | | |

FIG. 17

Sanford Landing

| | Contact Info | Overview | Community Amenities | Development Features | Unit Mix/Rent | Unit Amenities | Rent Comps | Property Pictures |
|---|---|---|---|---|---|---|---|---|

Save UnitMixTable +Add New Unit

| | ID | Model Name | Qty | Unit type | Bedrooms | Den | Loft | Furn | Baths | AC SF | Starting Rent/Mo | Current Rent/SF | Rent as of date | Units Rentable | Units Rented | |
|---|---|---|---|---|---|---|---|---|---|---|---|---|---|---|---|---|
| 1 | 783 | | 104 | F | 1 | No | No | No | 1 | 783 | 600 | $0.77 | 9/30/2004 | 0 | 0 | (Delete) |
| 2 | 925 | | 52 | TH | 2 | No | No | No | 1 | 925 | 710 | $0.77 | 9/30/2004 | 0 | 0 | (Delete) |
| 3 | 925 | | 52 | TH | 1 | No | Yes | No | 2 | 925 | 720 | $0.78 | 9/30/2004 | 0 | 0 | (Delete) |
| 4 | 983 | | 56 | F | 2 | No | No | No | 2 | 983 | 765 | $0.78 | 9/30/2004 | 0 | 0 | (Delete) |
| | Totals/Avgs | | 264 | | | | | | | 881 | $680.30 | $0.77 | | | | |

◆ Occupancy>>
Rentable Units: 264 ◆ Rented Units: 250 ◆ Occupancy %: 94.70% ◆ As of Date: 9/15/2003

Occupancy Comments:
2 models included in the total number of units unoccupied.

Web Occ Date:
9/15/2003

Sanford Landing

| Contact Info | Overview | Community Amenities | Development Features | Unit Mix/Rent | Unit Amenities | Rent Comps | Property Pictures |

240 ◄

244 ►

Fire Places: [Fireplace ▼]  Disposal: [Disposal ▼]

Ceiling Fans: [Ceiling fan ▼]  Range: [Electric Range ▼]

Blinds: [Blinds ▼]  Storage: [Outside Storage (Some) ▼]

Vaulted Ceilings: [Vaulted ceilings (9 ft ceilings) ▼]  Miscellaneous:

Height: [ ▼ ] ft.  IESS [N]

Central Heating: [Each unit has central heat/air ▼]  Internet: [DSL]

Wall to wall carpet: [Wall to wall carpeting ▼]  Comments: [Pest control included in]

Other Flooring: [ ▼ ]  PRICING VARIABLES:

Refrigerator: [Refrigerator ▼]  W/Dryer Rental: [$30/mth]

Microwave: [Microwave ▼]  Fire Place: [ ]

Wetbar: [ ▼ ]  Vaulted Ceiling: [ ]

FIG. 19

Sanford Landing

| Contact Info | Overview | Community Amenities | Development Features | Unit Mix/Rent | Unit Amenities | Rent Comps | Property Pictures |

Congratulations. You can now do a rent survey of comparable apartments in your submarket. Enter up to 10 Apartment Names that you concider to be comparable to your property:

Properties In The Area:
(Plot All On Map) / (Plot Selected Map)

- ⦿ 1: Arbor Lakes
  100 Arbor Lakes Cr
  Sanford ,FL 32771
  Year built: 2001  Number Of Units: 282
  Plot on Map? ☐

- ○ 2: Cedar Creek
  2450 Hartwell Ave.
  Sanford ,FL 32771
  Year built: 1991  Number Of Units: 140
  Plot on Map? ☐

- ○ 3: Cobblestone Crossing
  1950 Pebble Ridge Ln.
  Sanford ,FL 32771
  Year built: 2002  Number Of Units: 294

View All Properties within [ 1 ▸ ] mile(s)

Property To Assign:
[ 1 ▸ ]
[ Assign ]

Plot on Map

| # | Name | | | |
|---|---|---|---|---|
| 1 | Maitland Oaks | Up | Down | Clear |
| 2 | Roselea Willows | Up | Down | Clear |
| 3 | Jasmine at Maitland | Up | Down | Clear |
| 4 | Sumerset | Up | Down | Clear |
| 5 | Camden Fountains | Up | Down | Clear |
| 6 | Coral Bay | Up | Down | Clear |
| 7 | Rosemont Country Club | Up | Down | Clear |
| 8 | Harbor Cove | Up | Down | Clear |
| 9 | | Up | Down | Clear |
| 10 | | Up | Down | Clear |

[ Save ] [ Search ]

SYSTEM AND METHOD FOR THE MAINTENANCE AND MANAGEMENT OF COMMERCIAL PROPERTY DATA

FIELD OF THE INVENTION

The present invention relates generally to networked computerized systems and methods. More specifically, the present invention relates to systems and methods for gathering, for maintaining and for managing a commercial property database.

BACKGROUND OF THE INVENTION

Data is a valuable resource. Companies pay to have access to data relating to individuals, to other companies, to properties, etc. Access to the data allows decision makers to make more informed decisions. For example, access to competitor pricing information provides a business with data to which their own products and prices can be compared. Some companies build and maintain the data that is sold to other companies or individuals. Typically, maintenance of the data involves periodic phone calls to competitors to determine, for example, current pricing information, current inventory levels, occupancy rates, etc. This is a time consuming, expensive, and error prone process. Additionally, some data owners are hesitant to provide information relating to their business because it may provide a competitor with an advantage. Thus, there is a need for a method of maintaining data current in a commercial database that includes data relating to companies and to properties having different owners and/or property managers. Further, there is a need for a method that encourages owners and/or property managers to maintain the data themselves. Even further, there is a need to make the maintenance process convenient and easy to use with less expense to all parties. Finally, there is a need for various non-profit associations to provide a service for its membership that will help them recruit new members and retain existing members.

SUMMARY OF THE INVENTION

In general, a particular example of the invention relates to a system and a method of maintaining data in a database current where the database includes data relating to commercial real estate properties. The individuals that can maintain the data current are encouraged to update the data periodically by providing a service to the individuals after they have updated the data. The individuals do not have control of the database, and thus, must be encouraged to update the database themselves.

An exemplary embodiment relates to a first method for maintaining current data in a database. The first method includes (a) sending a request to verify the accuracy of a data item to a data verifier, the data item selected from a set of data items, the data verifier associated with the data item, the request including an offer for a service to be provided if the data verifier verifies the accuracy of the data item; (b) receiving a response from the data verifier, the response indicating that the data item is verified; and (c) providing the service to the data verifier after receiving the response.

Another exemplary embodiment of the invention includes a system that implements the operations of the first method. Yet another exemplary embodiment of the invention includes computer-readable instructions that, upon execution by a processor, cause the processor to implement the operations of the first method.

An exemplary embodiment relates to a second method for maintaining current data in a database. The second method includes (a) creating a user account, wherein the user account includes data access rules; (b) providing access by the user account to a set of data items in a database based on the data access rules, wherein a user of the user account can send a request to verify the accuracy of a data item to a data verifier, the data item selected from the set of data items, the data verifier associated with the data item, the request including an offer for a service to be provided if the data verifier verifies the accuracy of the data item, and can receive a response from the data verifier, the response indicating that the data item is verified; and (c) providing the service to the data verifier after the response is received.

Another exemplary embodiment of the invention includes a system that implements the operations of the second method. Yet another exemplary embodiment of the invention includes computer-readable instructions that, upon execution by a processor, cause the processor to implement the operations of the second method.

Other principal features and advantages of the invention will become apparent to those skilled in the art upon review of the following drawings, the detailed description, and the appended claims.

BRIEF DESCRIPTION OF DRAWINGS

Exemplary embodiments will hereafter be described with reference to the accompanying drawings, wherein like numerals will denote like elements.

FIG. 4 depicts a user account interface of the database maintenance application of FIG. 3 in an exemplary embodiment.

FIG. 5 depicts a new user form of the database maintenance application of FIG. 3 in an exemplary embodiment.

FIG. 7 depicts a user interface for the data user application of FIG. 6 in an exemplary embodiment.

FIG. 9 depicts an electronic message template selection interface of the data user application of FIG. 6 in an exemplary embodiment.

FIG. 11 depicts an electronic message received by a data verifier in an exemplary embodiment.

FIG. 12 depicts a new user account interface of the data verifier application of FIG. 10 in an exemplary embodiment.

FIG. 15 depicts a second data item editing interface of the data verifier application of FIG. 10 in an exemplary embodiment.

Figure 16:
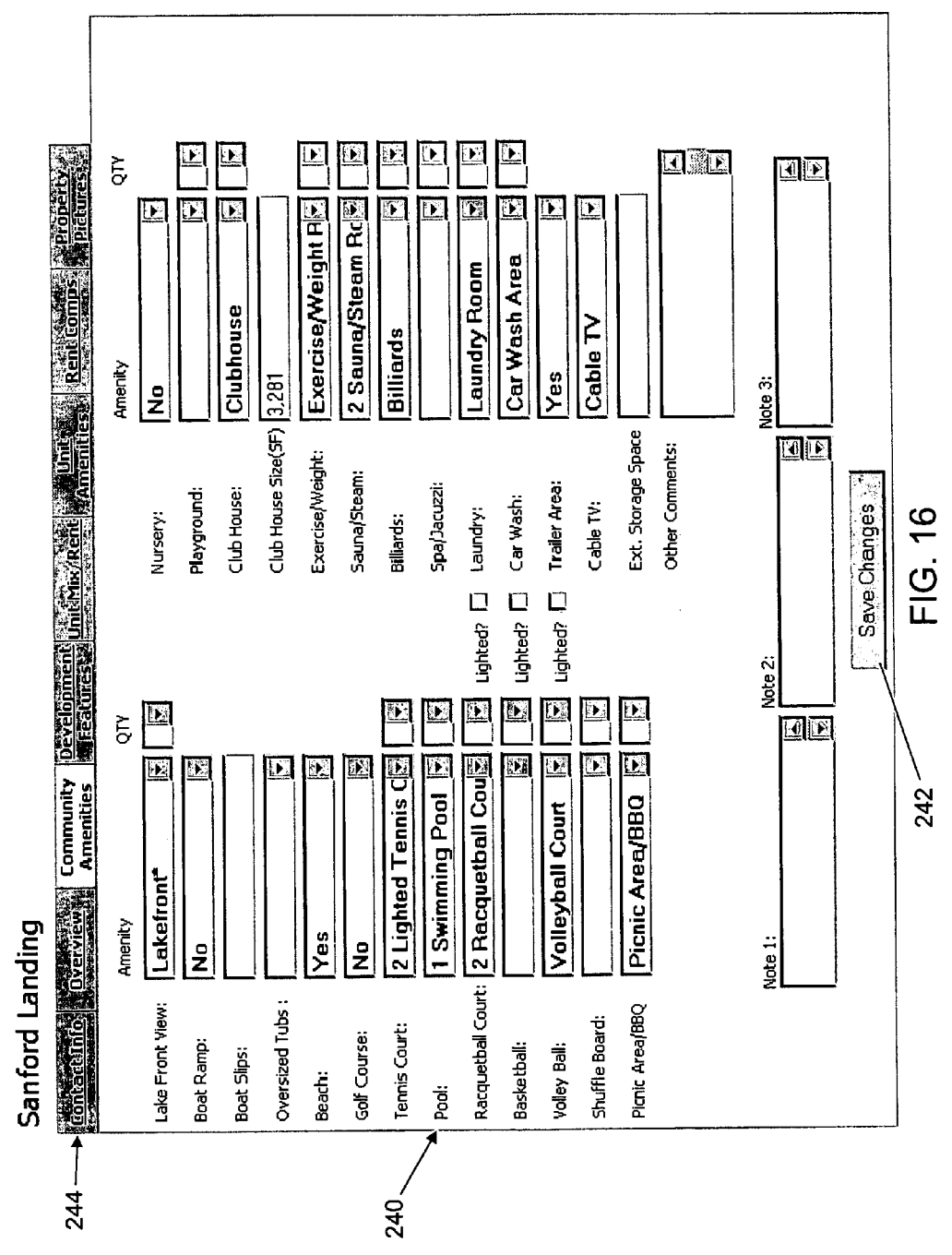

FIG. 16 depicts a third data item editing interface of the data verifier application of FIG. 10 in an exemplary embodiment.

FIG. 17 depicts a fourth data item editing interface of the data verifier application of FIG. 10 in an exemplary embodiment.

FIG. 18 depicts a fifth data item editing interface of the data verifier application of FIG. 10 in an exemplary embodiment.

FIG. 19 depicts a sixth data item editing interface of the data verifier application of FIG. 10 in an exemplary embodiment.

FIG. 20 depicts a service interface of the data verifier application of FIG. 10 in an exemplary embodiment.

DETAILED DESCRIPTION OF EXEMPLARY EMBODIMENTS

Consulting services gather information in metropolitan areas and resell the data. For example, apartment managers/owners desire current data relating to rental rates, occupancy rates, provided amenities, etc. of their competitors. The data gathering process uses phone calls to apartment managers and/or owners to verify the accuracy of the currently available apartment information. The data may be gathered by apartment associations to summarize data for their members, the city, etc. Alternatively, competitors may call seeking to obtain the information for individual use. Similarly, hotels desire current room rates to maintain competitive pricing. Until now, no one has devised a method that encourages property owners to keep the information current.

Figure 1:
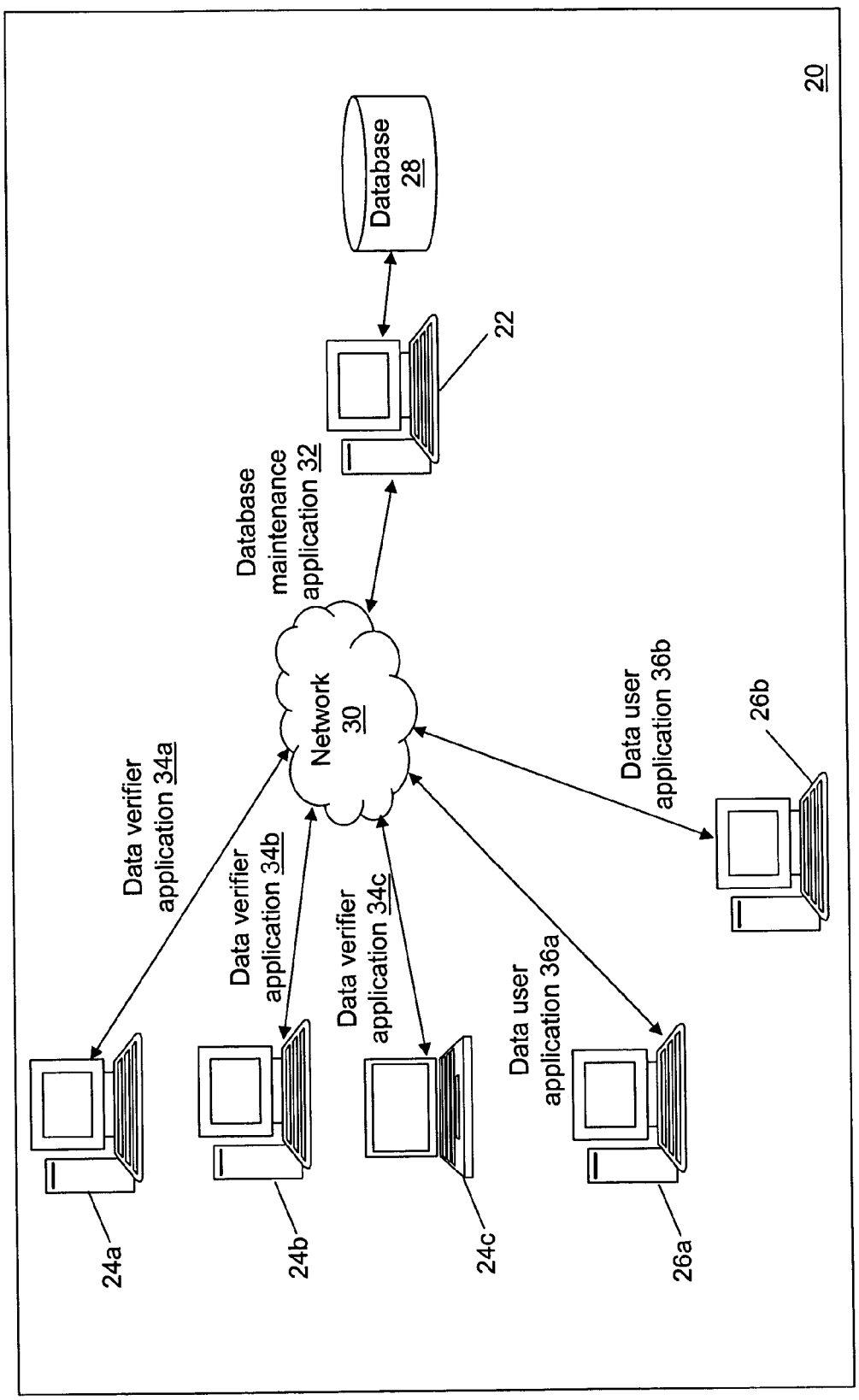
FIG. 1 is a general diagram depicting a database maintenance system in an exemplary embodiment.

With reference to FIG. 1, a database maintenance system 20 in accordance with an exemplary embodiment is shown. The database maintenance system 20 may include a database management device 22, data verifier devices 24a-24c, data user devices 26a, 26b, a network 30, and a database 28. The system 20 is comprised of devices 22, 24, 26 that can communicate through the network 30. The system 20 may comprise any combination of wired or wireless networks including a cellular telephone network, a wireless Local Area Network (WLAN), a Bluetooth personal area network, an Ethernet LAN, a token ring LAN, a wide area network, the Internet, etc. The system 20 may include both wired and wireless devices.

Connectivity to the network 30 may include long range wireless connections, short range wireless connections, and various wired connections including telephone lines, cable lines, power lines, Ethernet lines, combinations of these wired connections, etc. The devices 22, 24, 26 may communicate using various messaging technologies/protocols including the transmission control protocol (TCP), the internet protocol (IP), the file transfer protocol (FTP), hypertext transfer protocol (HTTP), short messaging service, multimedia messaging service, e-mail, Instant Messaging Service, facsimile, etc. Other messaging technologies/protocols not specifically mentioned herein and/or not yet invented may be used without departing from the spirit and scope of the invention. The exemplary devices of system 20 may include computers of any form factor, a cellular telephone, a personal digital assistant, etc.

The database management device 22 performs the operations of a database maintenance application 32 that provides an interface for the user of the database management device 22. In an exemplary embodiment, the database manager application 32 may be a web application, and the interface may be provided using a browser application. Each data verifier device 24a-24c performs the operations of a data verifier application 34a-34c that provides an interface for the user of the respective data verifier device 24a-24c. In an exemplary embodiment, the data verifier applications 34a-34c may be browsers under the control of the database maintenance application 32. Each data user device 26a, 26b performs the operations of a data user application 36a, 36b that provides an interface for the user of the respective data user device 26a, 26b. In an exemplary embodiment, the data user applications 36a, 36b may be browsers under the control of the database maintenance application 32. There may be any number of database management devices, data verifier devices, and data user devices in communication using the network 30. Additionally, the database management device 22 may execute any or all of the operations of the database maintenance application 32, of the data verifier application 34, and of the data user application 36. The database management device 22 may be in communication with the database 28 possibly through the network 30 or another network. Alternatively, the database 28 may be located in a memory of the database management device 22. There may be one or more database 28.

Figure 2:
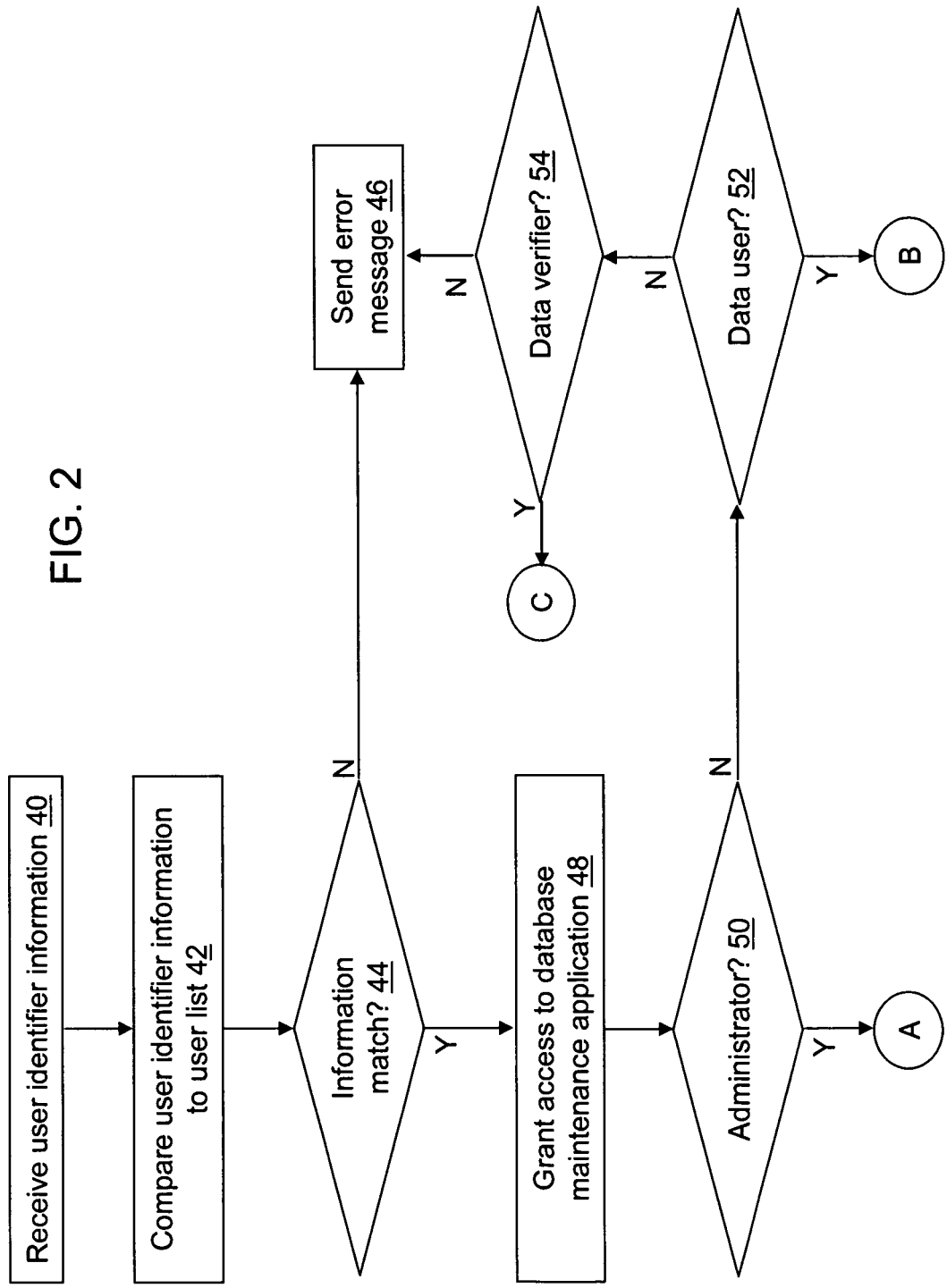
FIG. 2 is a first flow diagram depicting operations performed in a database maintenance application in an exemplary embodiment.

With reference to FIG. 2, exemplary operations of the database maintenance application 32 are shown. In an operation 40, user identification information is received from a user of the database maintenance application 32 at the database management device 22 possibly through the network 30. The received user identification information may include a user identifier and a password as known to those skilled in the art. The received user identification information is compared to a user list accessible by the database maintenance application 32. The user list may be stored in the database 28. In an operation 44, whether or not the user identification information is matched to a record of the user list is determined. If no match of the received user identification information is found, an error message is sent in an operation 46. If a match of the received user identification information is found, access to the database maintenance application 32 is granted in an operation 48. For example, a user may access the database maintenance application 32 using a browser application.

Different users are granted different access rights to the data stored in the database 28 through the database maintenance application 32. If the user is determined to be an administrator in an operation 50, processing continues with operation A of FIG. 3. If the user is determined to be a data user in an operation 52, processing continues with operation B of FIG. 6. If the user is determined to be a data verifier in an operation 54, processing continues with operation C of FIG. 10. If the user is not determined to be one of the administrator, the data user, or the data verifier, an error message is sent in operation 46. Each type of user has data access rules associated therewith. For example, an apartment association is related to a geographic area. As a result, a specific association may be limited to only properties in that area. As an example, the Tampa Association has access to properties in the Tampa metropolitan area. Thus, there may be only one database that includes property data for all associations, but each user may access only a limited set of data stored within the database.

For example, a data verifier may have access to only a single data item; whereas, a data user may have access to a plurality of data items. An administrator may have access to all data items. Additionally, access rights include the ability of the user to create a new data item, to modify an existing data item, to delete a data item, the create/delete/modify user account information, etc.

Figure 3:
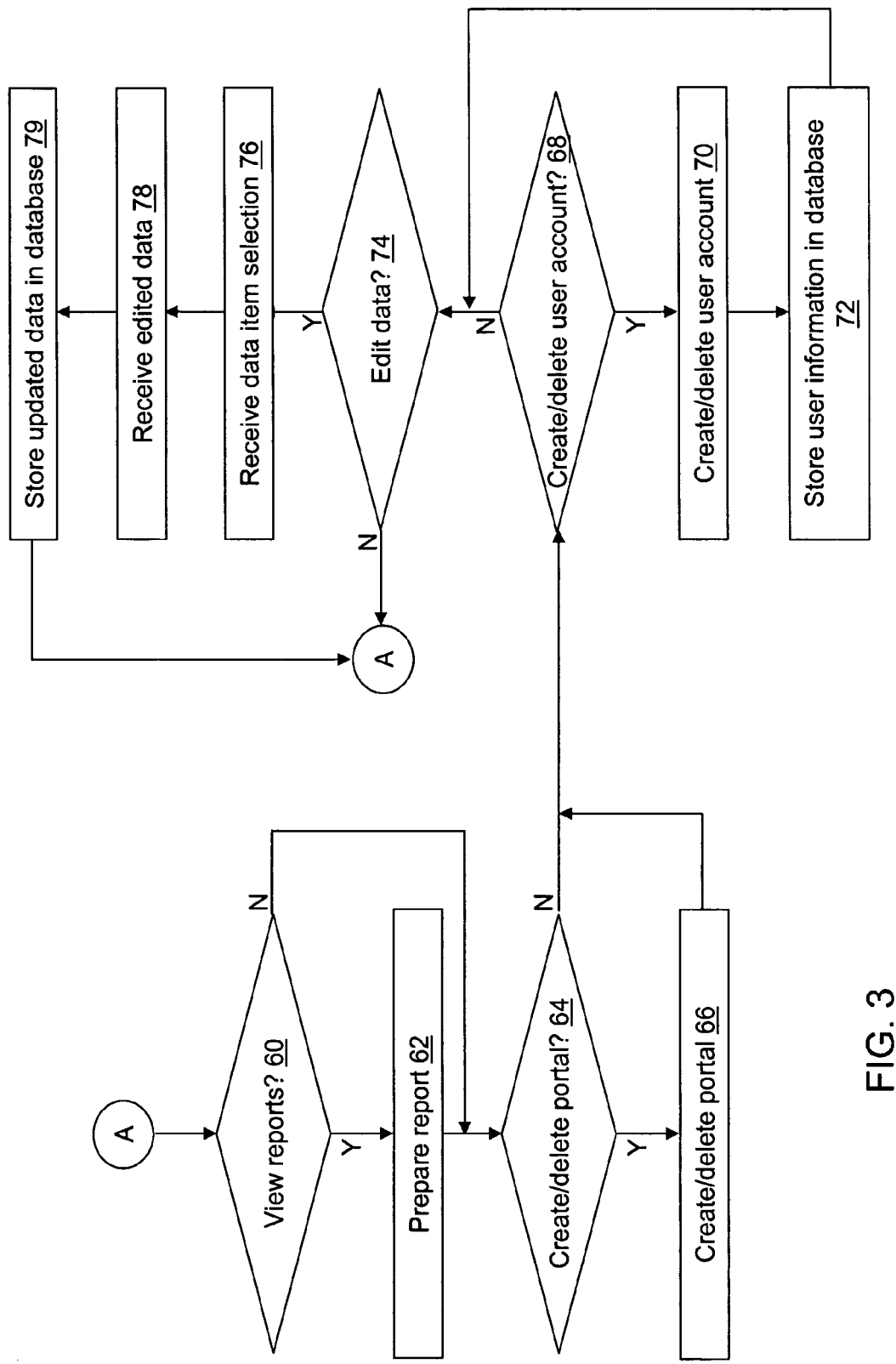
FIG. 3 is a second flow diagram depicting operations performed in a database maintenance application in an exemplary embodiment.

With reference to FIG. 3, exemplary operations of the database maintenance application 32 continuing from operation A are shown. The administrator is a class of user that has access to all of the information available through the database maintenance system 20. A plurality of users may have administrator access privileges. The administrator can view reports relating to all data items stored in the database 28, create/delete a portal for access by other data users, create/delete administrator accounts, data user accounts, and/or data verifier accounts, and edit all data stored in the database 28. As known to those skilled in the art, any of these functions can be selected at any sequence by the administrator, for example through selection of a menu item or a button presented by a user interface of the database maintenance system 20. Additional and fewer functions may be performed by the administrator.

In an operation 60, an option to view reports is provided to the administrator. An example report includes occupancy rates, rental rates, and available units for a geographical area, over time, for a unit type, etc. The geographical area may be small or large. If the option is selected, a report is prepared in an operation 62. In an operation 64, an option to create/delete a portal is provided. If the option is selected, a portal is created/deleted in an operation 66. Additional options may allow modification of the portal. For example, the background of the portal interface may be modified to reflect a name change. In an operation 68, an option to create/delete a user account is provided. If the option is selected, a user account is created/deleted in an operation 70. The user account may be an administrator account, a data user account, and/or a data verifier account. Additional maintenance options may be provided also. For example, a user account may be edited to reflect an address change, a name change, an e-mail address change, a title change, etc. In an operation 74, an option to edit data in the database 28 is provided. If the option is selected, a data item can be selected for editing by an administrator. In an operation 76, the data item selection is received. The data item selected for editing is presented to the user in the user interface so that the administrator can modify any of the fields associated with the data item. In an operation 78, the edited fields of the selected data item are received. In an operation 79, the updated data item is stored in the database 28. Processing may continue until the user chooses to log out from the database maintenance application 32 as known to those skilled in the art.

With reference to FIG. 4, an exemplary user account interface 150 of the database maintenance application 32 is provided. The exemplary user account interface 150 allows the administrator to create, to delete, and/or to modify user account information including user identifier information such as the "Member ID" and the "Password". For example, the administrator can select a user account to modify by "double-clicking" on a member identifier 152. Selecting any of the data header fields 153 allows sorting of the presented list of user accounts based on that field. For example, selecting "LastName" data header field 154 allows sorting of the user accounts by the last name of the account member. A "RoleName" data header field 156 defines the type of user. For example, "Admins" indicates an administrator account, and "Property Manager" indicates a data verifier account. A "New Member" button 158 allows the administrator to create a new user account. In an exemplary embodiment as shown in FIG. 5, selection of the "New Member" button 158 causes presentation of the new user form 160 of the database maintenance application 32. The administrator enters the appropriate data or makes the appropriate selection for each user account field. The new user account information is stored in the database 28 after selection of the "Save" button 162. A similar form is presented to modify an existing user account. Selection of the "Delete" button 164 removes the user account from the database 28. Alternatively, the user account can be disabled through selection of "Yes" in the drop down menu 166 without deletion.

Figure 6:
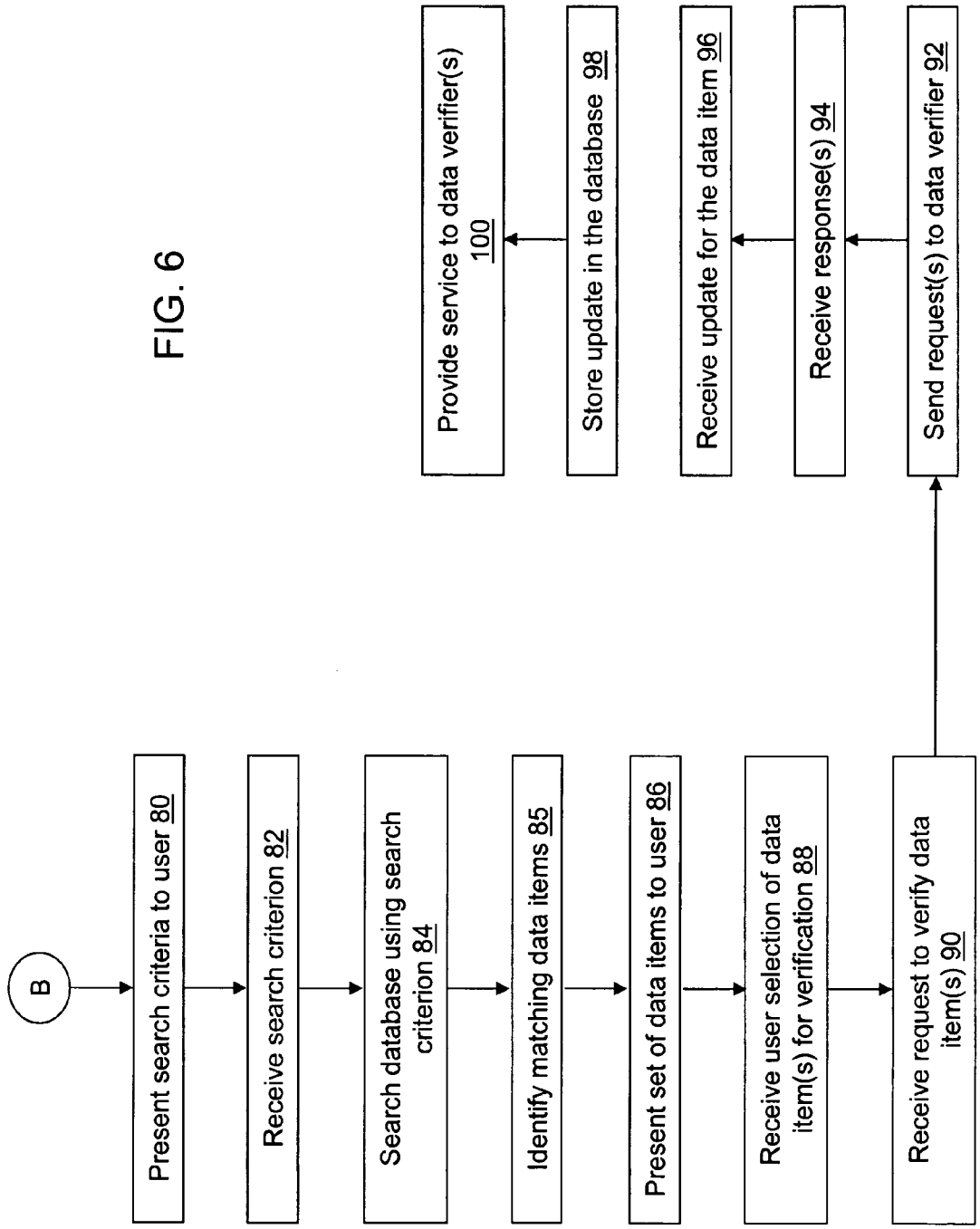
FIG. 6 is a flow diagram depicting operations performed in a data user application in an exemplary embodiment.

With reference to FIG. 6, exemplary operations of the data user application 36 continuing from operation B are shown. The data user may have permission through access rules to view, to modify, and/or to delete a set of data items. The set of data items may be large. As a result, the data user may utilize a search capability to identify specific data items. Thus, in an operation 80, search criteria relating to the set of data items is presented to the data user. In an operation 82, one or more search criterion is received for identifying a smaller set of data items from the set of data items. In an operation 84, the database 28 is searched using the one or more search criterion received. In an operation 85, data items matching the one or more search criterion are identified. In an operation 86, the identified set of data items is presented to the data user. The data user can further select from among the identified data items to perform a function. For example, the data user may select one or more data item for verification of the data accuracy. The data user also may edit a data item. A plurality of data items may be selected by the data user.

In an operation 88, the data items(s) selected for verification are received. In an operation 90, a request is received to verify the selected data item(s). The operations 88 and 90 may be performed simultaneously. In an operation 92, the received request(s) are sent to the data verifier associated with each data item. The request for example may be an electronic message. The electronic message may be sent using a transmission technology that includes e-mail, instant messaging, short messaging, multimedia messaging, facsimile, HTTP, FTP, TCP, IP, etc. In an operation 94, a response to the request is received. The response may be a electronic message that states that the data item is current and hence no change is required. Alternatively, the response may be an electronic message that includes verification data with which to update the data item. In an operation 96, an update of the data item is received. For example, the data user may edit the data item using the verification data received in the response. In another alternative, an updated data item may be received through editing of the database 28 using a user interface of the data verifier application 34. Thus, the operations 94 and 96 may be combined into a single operation.

The updated data item is stored in the database 28 in an operation 98. In an operation 100, a service is provided to the data verifier(s). The service may be provided at no cost to the data verifier to encourage the data verifier to maintain current data in the database 28. For example, if the data verifier is a rental property owner/manager, the service may be the generation of free reports relating to some or all of the data items. Alternatively, the service may be to view some or all of the data items in order to make comparisons. As yet another alternative, the service may be a free membership, free market surveys, etc. For example, the free market survey may be provided to a member of a local apartment association. The survey may include a survey of ten properties surrounding the member's property. The survey is used as an enticement to encourage the member or the non-member to provide the data. The service is not provided unless a response is received from the data verifier.

FIG. 7 depicts a user interface 180 for the data user application 36 including a "Reports" menu item 182, an "Admin" menu item 184, action buttons 186, and search criteria 188. Selection of the "Reports" menu item 182 allows the data user to prepare a report relating to the set of data items or a selected set of data items. Selection of the "Admin" menu item 184 allows the data user to perform administrative functions such as those indicated by the action buttons 186. For example, selection of a "Property Search" action button 190 presents the search criteria 188 allowing the data user to search for a specific data item or set of data items. Selection of a "Member Editor" action button 192 allows the data user to add, to delete, and/or to modify data verifier accounts. Selection of a "Message Log" action button 194 allows the data user to review electronic messages including requests sent to data verifiers and responses received from data verifiers. Selection of a "Logout" action button 196 allows the data user to exit the data user application 36.

Figure 8:
FIG. 8 depicts a data item selection interface of the data user application of FIG. 6 in an exemplary embodiment.

FIG. 8 depicts an exemplary interface 200 that includes a set of data items identified based on one or more search criterion selected by the data user. The interface 200 includes information relating to apartment rental properties. Each apartment rental property is a data item that can be selected for editing using an "Edit" button 202. The interface 200 also includes a data verifier e-mail address 204 associated with each data item. The e-mail address, for example, may be used to request verification of the accuracy of the data item by the data verifier. A plurality of data items can be selected using a check box 206. A plurality of requests can be sent to each data verifier associated with data items selected using the check box 206 by selecting an "E-mail Contacts" button 208. A single data verifier may be associated with a plurality of data items. For example, a single property manager may manage multiple properties. To reduce the number of requests sent to the data verifier, the request for verification of a plurality of data items may be combined into a single request by recognizing that a data verifier is common to multiple selected data items.

After selecting the "E-mail Contacts" button 208, the data user may be presented with a request template window 210 as shown in FIG. 9. Using the request template window 210, the user can select a template for the request to the data verifier. The template includes boiler-plate text that is common to each request and fields that are unique to each data item and are thus filled in after selection of the template based on the data item. For example, the property name may be inserted into the request.

Figure 10:
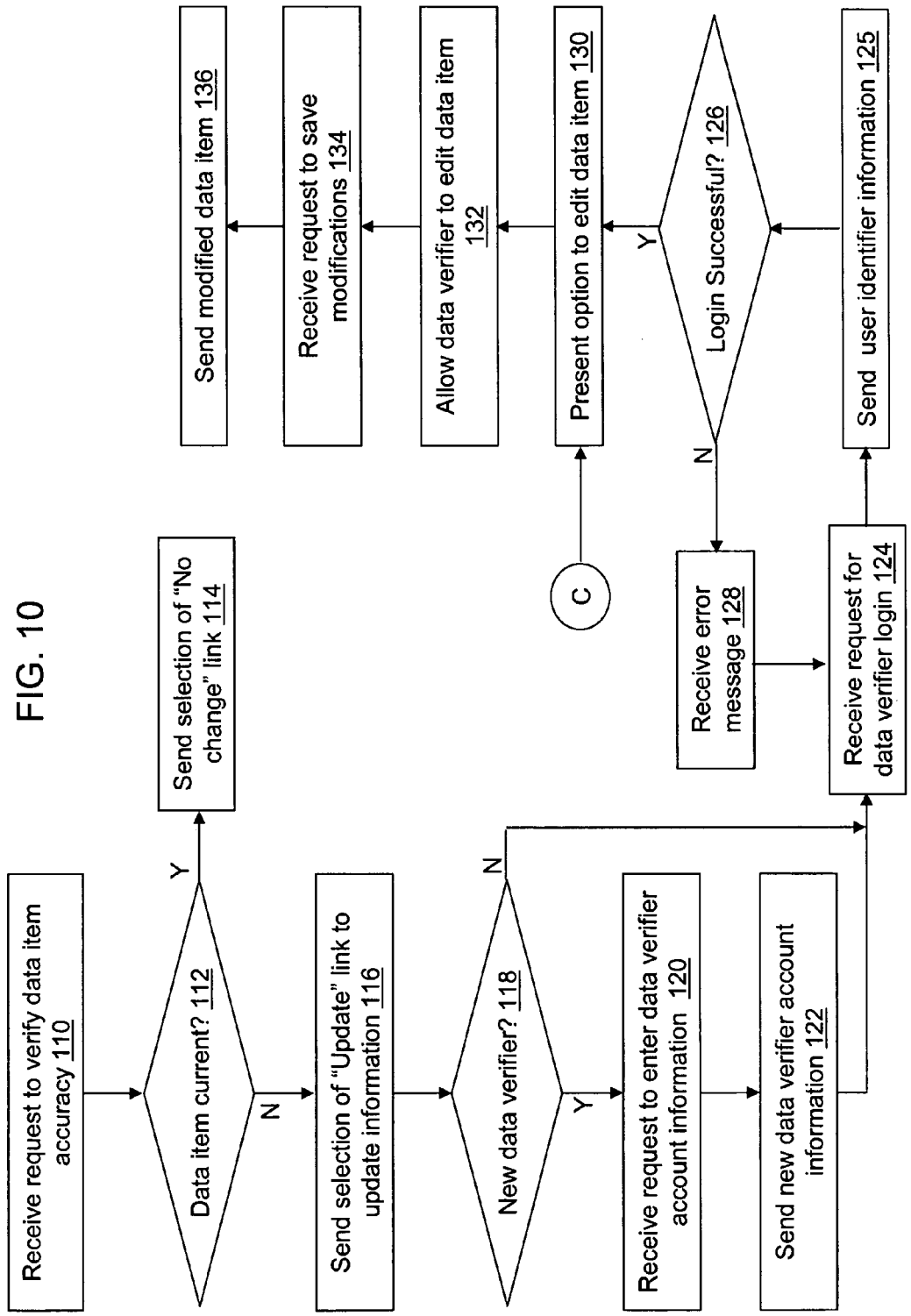
FIG. 10 is a flow diagram depicting operations performed in a data verifier application in an exemplary embodiment.

With reference to FIG. 10, exemplary operations of the data verifier application 34 are shown. The data verifier may have permission through access rules to view, to modify, and/or to delete a set of data items. In an operation 110, a request is received to verify the accuracy of a data item. The request may include a plurality of data items if, for example, the data verifier is associated with a plurality of data items. FIG. 11 includes an exemplary request 210 received by a data verifier. The exemplary request 210 includes a "no change" link 212, an "Update Property Information" link 214, and a summary of the data item information 216. Again with reference to FIG. 10, a determination in an operation 112 identifies whether or not the data item received is current. If the summary of the data item information 216 is current, the date verifier, for example, may select the "no change" link 212, in an operation 114. If the summary of the data item information 216 is not current, the date verifier, for example, may select the "Update Property Information" link 214 in an operation 116. The exemplary request 210 may have been created for the data verifier using one of the message templates of FIG. 9, for example.

Selection of the "Update Property Information" link 214, in an operation 118, triggers a determination of whether or not the data verifier is a new user of the database maintenance system 20. If the data verifier is a new user, in an operation 120, a user account request form is received so that the data verifier can enter user account information. FIG. 12 includes an exemplary user account request form 220 that may be received. The user account request form 220 may include user account information fields 222 and a "Create Account" button 224. The data verifier enters data in the user account information fields 222. In an operation 122, the account information is sent to the database maintenance application 32. For example, the data verifier selects the "Create Account" button 224 to cause the account information to be sent.

Figures 13, 14:
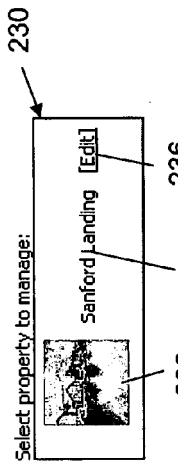
FIG. 13 depicts a data item selection interface of the data verifier application of FIG. 10 in an exemplary embodiment.
FIG. 14 depicts a first data item editing interface of the data verifier application of FIG. 10 in an exemplary embodiment.

In an operation 124, the data verifier receives a request to login to the database maintenance application 32. In operation 125, the user identifier information is sent to the database maintenance application 32. The success of the login is determined in an operation 126. If the login is unsuccessful, an error message is received in an operation 128 and processing continues with the operation 124. If the login is successful, the date verifier is presented with one or more data item to edit in an operation 130. For example, the data verifier may be presented with a data item edit interface 230 shown with reference to FIG. 13. The data item edit interface 230 may include a data item photo 232, a data item name 234, and a data item "Edit" button 236. The data verifier may be presented with a plurality of data items for verification. In an operation 132, the date verifier is allowed to edit the data item. For example, selection of the data item "Edit" button 236 may present the data verifier with a data item editing interface 240 as shown with reference to FIG. 14. In an operation 134, a request is received to save the modifications made to the date item fields. For example, the data verifier may select a "Save Changes" button 242 of the data item editing interface 240. In an operation 136, the modified data item is sent. For example, the modified data item may be sent to the database maintenance application 32 that stores the modified data item in the database 28. In an alternative embodiment, the modified data item may be sent to the data user in an electronic message.

FIGS. 14-19 include exemplary data fields of a data item for a rental property named "Sanford Landing". Either of the data user, the data verifier, or the administrator may edit the data fields of the data item using the data item editing interface 240 as shown in FIGS. 14-19. The date verifier is presented with the data item interface 240 through selection of the data item "Edit" button 236 of FIG. 13. The data user may edit the data item after selection of the "Edit" button 202 of FIG. 8 using the verification data included in the electronic message thereby updating the data item in the database 28. The data fields may be organized under a plurality of data tabs 244. Exemplary data tabs 244 for maintaining data related to apartment rental information include "Contact Info", "Overview", "Community Amenities", "Development Features", "Unit Mix/Rent", "Unit Amenities", "Rent Comps", and "Property Pictures".

To encourage property owners/managers to respond to the request for verification of the data item, a service is provided after the response is received at the database maintenance application 32. For example, after sending a response to the request for verification of the data item, the data verifier may be presented with a service interface 250 as shown with reference to FIG. 20. In the exemplary embodiment of FIG. 20, the data verifier is permitted to select up to ten comparable properties for a rent comparison report. Various options included in the service interface 250 allow the data verifier to view properties within a selectable radius of the property to which the data verifier is associated. Other services include the ability to receive additional types of reports relating to the data item. By providing the service and by simplifying the process of updating data items in a database, more accurate data can be maintained in a commercial database including data from a variety of entities. Time consuming phone calls are no longer required and all parties benefit from the maintenance of the more accurate data. Owners of properties who do not have a web site or advertise on-line with an apartment advertising service have the ability to send rental information to prospective tenants who call about their property. Many small apartment owners are included in this category.

The foregoing description of exemplary embodiments of the invention have been presented for purposes of illustration and of description. It is not intended to be exhaustive or to limit the invention to the precise form disclosed, and modifications and variations are possible in light of the above teachings or may be acquired from practice of the invention. For example, the exemplary embodiments are associated with practice of the invention using data items associated with rental property. The data items can be associated with different types of information. For example, the data items may be associated with other types of properties including temporary lodging properties such as hotels. The exemplary embodiments, components of which can be practiced separately or in combination, were chosen and described in order to explain the principles of the invention and as practical applications of the invention to enable one skilled in the art to utilize the invention in various embodiments and with various modifications as suited to the particular use contemplated. The functionality described may be implemented in a single executable or application or may be distributed among different modules without deviating from the spirit of the invention. Additionally, the order of execution of the operations described may be changed without deviating from the spirit of the invention. It is intended that the scope of the invention be defined by the claims appended hereto and their equivalents. Thus, the description of the preferred embodiments is for purposes of illustration and not limitation.

What is claimed is:

1. A non-transitory computer-readable medium having stored thereon computer-readable instructions that when executed by a computing device cause the computing device to:
    receive a first indicator of a plurality of data items stored in and selected from a database, wherein the first indicator indicates a desire to request verification of the accuracy of the plurality of data items, wherein the plurality of data items is associated with rental information for a multifamily residential property;
    create an electronic message requesting verification of the accuracy of the plurality of data items, the electronic message including a second indicator indicating the plurality of data items, an electronic address of a data verifier associated with the plurality of data items, a first link configured to indicate that the plurality of data items have not changed, a second link configured to indicate that at least one data item of the plurality of data items has changed, and an offer for a service to be provided if the data verifier selects either the first link or the second link;
    send the created electronic message to a second device using the electronic address of the data verifier;
    in response to selection of the first link, receive a second electronic message from the second device indicating that the plurality of data items are accurate;
    in response to selection of the second link, receive a third indicator indicating that at least one data item of the plurality of data items is not accurate;
    in response to receipt of the third indicator, send a login request to the second device, the login request configured to allow the data verifier at the second device to login to edit the same database from which the plurality of data items were selected to edit the at least one data item of the plurality of data items that is not accurate;
    receive user information in response to the login request, the user information including a username and a password associated with the data verifier;
    compare the received user information to stored login information;
    if the user information is correct based on the comparison, control presentation of the data item in a database maintenance application interface presented at the second device, receive an update to the data item through the database maintenance application interface, and store the received, updated data item in the same database from which the plurality of data items were selected; and
    after receiving the second electronic message or the third indicator, provide the service to the data verifier.

2. The non-transitory computer-readable medium of claim 1, wherein the plurality of data items are associated with rental information for a plurality of multifamily residential properties.

3. The non-transitory computer-readable medium of claim 2, wherein the second indicator indicates the plurality of multifamily residential properties.

4. The non-transitory computer-readable medium of claim 1, wherein the service comprises rental comparison data for a plurality of multifamily residential properties.

5. The non-transitory computer-readable medium of claim 1, wherein the service includes a free market survey.

6. The non-transitory computer-readable medium of claim 1, wherein the computer-readable instructions further cause the computing device to prepare a report including the updated data item.

7. The non-transitory computer-readable medium of claim 6, wherein the report includes rental rate comparisons for a plurality of multifamily residential properties.

8. The non-transitory computer-readable medium of claim 1, wherein the computer-readable instructions further cause the computing device to present a set of data items in a user interface window to allow selection of the plurality of data items prior to receiving the first indicator.

9. The non-transitory computer-readable medium of claim 8, wherein the computer-readable instructions further cause the computing device to request user identifier information prior to presenting the set of data items, wherein the set of data items is selected using the user identifier information.

10. The non-transitory computer-readable medium of claim 8, wherein the computer-readable instructions further cause the computing device to present search criteria in the user interface window to allow selection of a search criterion and to receive a selected search criterion, wherein the presented set of data items is identified based on the received search criterion.

11. The non-transitory computer-readable medium of claim 10, wherein the computer-readable instructions further cause the computing device to request user identifier information prior to presenting the search criteria, wherein the search criteria are identified using the user identifier information.

12. The non-transitory computer-readable medium of claim 9, wherein the computer-readable instructions further cause the computing device to create a user account associated with the user identifier information, wherein the user account includes data access rules.

13. The non-transitory computer-readable medium of claim 12, wherein the access rules include search criteria.

14. The non-transitory computer-readable medium of claim 13, wherein the search criteria are associated with real estate properties.

15. The non-transitory computer-readable medium of claim 12, wherein the access rules include report allowance parameters, the report allowance parameters defining user access to reports that present information relating to the set of data items.

16. The non-transitory computer-readable medium of claim 12, further comprising wherein the computer-readable instructions further cause the computing device to create a portal and to associate the user account with the portal.

17. The non-transitory computer-readable medium of claim 1, wherein the electronic message is sent using a transmission technology selected from the group consisting of a transmission control protocol, an internet protocol, a file transfer protocol, a hypertext transfer protocol, short messaging, multimedia messaging, electronic mail, and instant messaging.

18. The non-transitory computer-readable medium of claim 1, wherein the computer-readable instructions further cause the computing device to create a user account associated with the data verifier, wherein the user account includes data access rules and the login information.

19. The non-transitory computer-readable medium of claim 18, wherein the access rules include data access allowance parameters, the data access allowance parameters defining data verifier access to the data item.

20. The non-transitory computer-readable medium of claim 19, wherein the access to the data item includes one or more of access to create a new data item in the database, access to modify the data item in the database, and access to delete the data item from the database.

21. A method for maintaining data current in a database, the method comprising:
    receiving, at a first computing device, a first indicator of a plurality of data items stored in and selected from a database, wherein the first indicator indicates a desire to request verification of the accuracy of the plurality of data items, wherein the plurality of data items is associated with rental information for a multifamily residential property;
    creating, at the first computing device, an electronic message requesting verification of the accuracy of the plurality of data items, the electronic message including a second indicator indicating the plurality of data items, an electronic address of a data verifier associated with the plurality of data items, a first link configured to indicate that the plurality of data items have not changed, a second link configured to indicate that at least one data item of the plurality of data items has changed, and an offer for a service to be provided if the data verifier selects either the first link or the second link;
    sending the created electronic message to a second device using the electronic address of the data verifier;
    in response to selection of the first link, receiving, at the first computing device, a second electronic message from the second device indicating that the plurality of data items are accurate;
    in response to selection of the second link, receiving, at the first computing device, a third indicator indicating that at least one data item of the plurality of data items is not accurate;
    in response to receipt of the third indicator, sending a login request to the second device, the login request configured to allow the data verifier at the second device to login to edit the same database from which the plurality of data items were selected to edit the at least one data item of the plurality of data items that is not accurate;
    receiving, at the first computing device, user information in response to the login request, the user information including a username and a password associated with the data verifier;
    comparing, at the first computing device, the received user information to stored login information;
    if the user information is correct based on the comparison, controlling presentation of the data item at the second device in a database maintenance application interface, receiving an update to the data item through the database maintenance application interface, and storing the received, updated data item in the same database from which the plurality of data items were selected; and
    after receiving the second electronic message or the third indicator, providing the service to the data verifier.

22. The method of claim 21, further comprising preparing a report including the updated data item.

23. The method of claim 21, further comprising presenting, at the first device, a set of data items in a user interface window configured to allow selection of the plurality of data items prior to receiving the first indicator.

24. The method of claim 21, further comprising requesting user identifier information, at the first device, prior to presenting the set of data items, wherein the set of data items is selected using the user identifier information.

25. The method of claim 24, further comprising controlling presentation of search criteria in the user interface window to allow selection of a search criterion and receiving a selected search criterion, wherein the presented set of data items is identified based on the received search criterion.

26. The method of claim 25, further comprising creating a user account associated with the user identifier information, wherein the user account includes data access rules.

27. The method of claim 26, wherein the access rules include search criteria.

28. The computer-readable medium of claim 27, wherein the search criteria are associated with real estate properties.

29. The method of claim 26, further comprising creating a portal and associating the user account with the portal.

30. The method of claim 21, further comprising creating a user account associated with the data verifier, wherein the user account includes data access rules and the login information.

31. The method of claim 30, wherein the access rules include data access allowance parameters, the data access allowance parameters defining data verifier access to the data item.

32. The method of claim 31, wherein the access to the data item includes one or more of access to create a new data item in the database, access to modify the data item in the database, and access to delete the data item from the database.

* * * * *